United States Patent [19]

Johnson

[11] 4,224,213
[45] Sep. 23, 1980

[54] SINGLE PACKAGE INORGANIC ZINC RICH PAINTS HAVING A SILICATE AND TITANATE ESTER COPOLYMER BINDER

[75] Inventor: Steven D. Johnson, Mission, Kans.

[73] Assignee: Cook Paint and Varnish Company, Kansas City, Mo.

[21] Appl. No.: 914,295

[22] Filed: Jun. 9, 1978

[51] Int. Cl.$^2$ .............................................. C08B 83/02
[52] U.S. Cl. ................................ 260/37 SB; 106/1.05; 106/1.12; 106/1.25; 528/425
[58] Field of Search ............. 528/425, 25; 260/37 SB, 260/429.5; 106/1.12, 1.05, 1.25, 129; 428/450

[56] References Cited

U.S. PATENT DOCUMENTS

| | | | |
|---|---|---|---|
| 2,512,063 | 6/1950 | Kreidl et al. | 260/429.5 |
| 2,716,656 | 8/1955 | Boyd | 260/429.5 |
| 3,247,147 | 4/1966 | Jarboe | 260/429.5 |
| 3,392,036 | 7/1968 | McLeod | 106/1.12 |
| 3,546,155 | 12/1970 | Chandler | 260/33.2 R |
| 3,730,743 | 5/1973 | McLeod | 106/14.44 |
| 3,846,359 | 11/1974 | Rostaing | 260/37 SB |
| 3,927,052 | 12/1975 | Vizurraga | 260/429.5 |

*Primary Examiner*—Lewis T. Jacobs
*Attorney, Agent, or Firm*—Cushman, Darby & Cushman

[57] ABSTRACT

A self-curing single package zinc rich coating composition utilizing a novel copolymer binder composed of a mixture of alkyl silicate and alkyl titanate that cures upon exposure to atmospheric moisture in accordance with the equation:

$$xSi(OR)_4 + yTi(OR')_4 + 2(x+y)H_2O \rightarrow (SiO_2)_x(TiO_2)_y + 4xROH + 4yR'OH$$

wherein R and R' are alkyl groups selected from a group of alkyls consisting of ethyl, n-propyl, isopropyl, n-butyl, isobutyl, sec-butyl and 2-ethyl hexyl.

Coating compositions utilizing the novel copolymer binder are formulated from a non-catalyzed silicate ester and an alkyl titanate ester having about 10% to 60% by weight titanate as $TiO_2$ of the total weight of $TiO_2$ and $SiO_2$. The binder and coatings formulated therefrom allow the formulation of a single package zinc rich coating containing zinc dust which exhibits a good shelf life and may be formulated with additional fillers such as talc, clay and modified bentonite and solvent to provide a composition for coating ferrous metal which is durable and resistant to corrosion from salt water.

6 Claims, No Drawings

SINGLE PACKAGE INORGANIC ZINC RICH PAINTS HAVING A SILICATE AND TITANATE ESTER COPOLYMER BINDER

BACKGROUND OF THE INVENTION

1. Field of the Invention

This invention relates to a self curing single package inorganic zinc rich coating composition comprised of a binder prepared from a blend of a non-catalyzed silicate ester and an alkyl titanate. More particularly, the binder of the invention is formulated from a neutral or alkaline alkyl silicate ester having a low level of hydrolysis blended with an alkyl titanate ester wherein about 10% to 60% by weight of titanate is present as $TiO_2$ to the total weight of $TiO_2$ plus $SiO_2$ in the copolymer blend.

2. Description of the Prior Art

Inorganic zinc rich paints have a long history of use in the protection of ferrous metals from corrosion in saline and atmospheric conditions that are not otherwise strongly acidic or alkaline. Zinc rich paint coating compositions consist basically of finely divided zinc dust or powder in a porous silicate matrix allowing electrical contact between the zinc dust and ferrous substrate to provide cathodic protection.

Since the development and introduction of these coatings around the time of World War II, research has been conducted to simplify their handling and application. The first coatings consisted of zinc dust and aqueous sodium silicate, which were cured by either baking at high temperatures or the post application of an acid solution to neutralize the alkali. Self curing coatings were developed later utilizing aqueous potassium, lithium or quarternary ammonium silicates as binders. Coatings of this type became insoluble upon drying.

A second method of providing zinc rich inorganic paints and coating compositions utilized organic solvents, usually alcoholic solutions of a partially hydrolyzed ethyl silicate. Coating compositions of this type are cured by the reaction of the ethyl silicate binder with atmospheric moisture.

Ethyl silicate, $Si(OC_2H_5)_4$, functions as a binder in these reactions because it reacts with atmospheric moisture by a two-step hydrolysis and condensation reaction which is summarized by the equation:

$$Si(OC_2H_5)_4 + 2H_2O \rightarrow SiO_2 + 4C_2H_5OH$$

This reaction has been too slow to be of practical value for coating compositions, so in practice the ethyl silicate binder has been pre-reacted by adding an acid stabilizer and approximately 80 to 90 percent of the amount of water required for a complete reaction. The acid, typically a strong mineral acid such as hydrochloric or sulfuric, catalyzes the hydrolysis reaction and renders the system metastable, presumably by forcing the silanol hydrolysis products to exist in the protonated form, less reactive than the nucleophilic ionized form as set forth in the following equation:

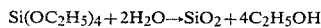

As long as such an acid is present, the system will tolerate amounts of water even greater than stoichiometric, condensing slowly, but as soon as the acid is neutralized and the system becomes alkaline, gelling occurs rapidly, presumably because of nucleophilic attack by ionized silanol groups on silicon atoms of other silicate or silanol groups to form siloxane linkages in accordance with the equation:

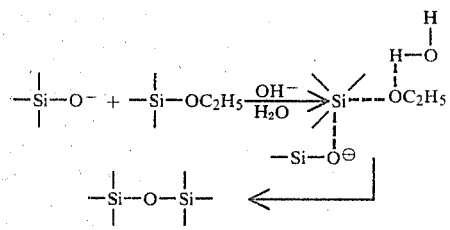

The acid stabilized binders are then formulated with neutral fillers such as talc, clay, mica, iron oxide, etc., and additional solvent, and packaged separately from the zinc dust. The zinc dust is stirred in just prior to application, and reacts with the acid stabilizer, causing the mixture to gel in about 8 to 24 hours. When the liquid mixture is applied to a surface, the solvent evaporates, the acid stabilizer reacts with the zinc or evaporates, and moisture as atmospheric humidity causes the system to cure.

The prior art zinc rich coating techniques and compositions have consequently shared the disadvantage of being two package materials requiring measuring, packaging and mixing just prior to the application of the coating. In addition, once the separate packages of zinc and carrier compositions were mixed, the coating had to be used within a relatively short time, usually a few hours. Material unused after the curing period had to be discarded. Other disadvantages of the prior art coating compositions included the uneconomical packaging and processing required for a two component system, the time spent packaging and then mixing and the resulting problems involved with using quantities other than in the prescribed package units.

It has long been a goal of the paint and coating industry to provide a coating composition which is an inorganic zinc rich single package coating composition having an acceptable shelf life and which is self curing upon exposure to the atmosphere. The single package inorganic zinc rich paints and coating compositions of the invention address these goals by providing a single package coating composition having shelf life stability and reasonable cure rates by employing a binder consisting of a mixture of alkyl silicate and alkyl titanate.

SUMMARY OF THE INVENTION

The present invention obviates the limitations and disadvantages of the prior art by providing a self curing single package inorganic zinc rich coating composition utilizing a novel binder comprised of a non-catalyzed alkyl silicate blended with an alkyl titanate and zinc dust which may be combined with optional fillers and solvents. The self curing copolymer blends of the invention comprise about 10% to 60% by weight titanate as $TiO_2$ to the total percent by weight of $TiO_2$ plus $SiO_2$. There is no upper limit of titanate modification beyond which package stability and acceptable cure rate deteriorate but at levels much above 50 to 60% by weight begin to show problems with respect to mudcracking. Preferred levels are 20 to 40% by weight titanate as $TiO_2$ to the total percent by weight of $TiO_2$ plus $SiO_2$.

The alkyl silicate component of the novel binder utilizes a non-catalyzed silicate curing according to the general equation:

$$Si(OR)_4 + 2H_2O \rightarrow SiO_2 + 4ROH$$

wherein R is an alkyl group selected from a group of alkyls consisting of ethyl, n-propyl, isopropyl, n-butyl, isobutyl, sec-butyl and 2-ethyl hexyl. It will be understood by those skilled in the art that the alkyl silicate polymer and other references to alkyl polymers includes low molecular weight dimers, trimers, etc., that may be present in the polymer and is considered included in the use of the term in the specification and claims. In the preferred embodiment non-catalyzed ethyl silicate such as tetraethylorthosilicate is utilized, which in its neutral or alkaline state proceeds to cure by a two step low level hydrolysis and condensation reaction summarized by the equation:

$$Si(OC_2H_5)_4 + 2H_2O \rightarrow SiO_2 + 4C_2H_5OH$$

The alkyl titanate component cures by undergoing a hydrolysis and condensation reaction similar to the alkyl silicate component and may be summarized by the equation:

$$Ti(OR)_4 + 2H_2O \rightarrow TiO_2 + 4ROH$$

wherein R is an alkyl group selected from a group of alkyls consisting of ethyl, n-propyl, isopropyl, n-butyl, isobutyl, sec-butyl, and 2-ethyl hexyl.

The alkyl silicate and alkyl titanate components are blended together with the zinc dust or powder to provide a zinc rich primer or coating composition for ferrous metal substrates. In addition to zinc, other optional components such as neutral fillers such as talc, clay, mica, iron oxide, modified bentonite and other such optional fillers may be added together with additional solvents such as xylene. The alkyl silicate, alkyl titanate copolymer binder containing zinc dust and optional components displays an acceptable shelf life and when employed as a coating cures by reacting with moisture in the atmosphere according to the equation:

$$xSi(OR)_4 + yTi(OR')_4 + 2(x+y)H_2O \rightarrow (SiO_2)_x(TiO_2)_y + 4xROH + 4yR'OH$$

wherein R and R' are alkyl groups selected from a group of alkyls consisting essentially of ethyl, n-propyl, isopropyl, n-butyl, isobutyl, sec-butyl and 2-ethyl hexyl.

The rate of the foregoing reaction cure can be controlled within limits as the rate of cure increases as the proportion of alkyl titanate is increased in the reaction mixture. As heretofore discussed, it has been found that coating compositions in accordance with the present invention have a threshold level of effectiveness of about 10% titanate as $TiO_2$ on the total weight of $TiO_2$ plus $SiO_2$.

In contrast to the prior art the advantages of the present invention are attained by blending alkyl titanates with alkyl silicates which utilize a low rate hydrolysis and condensation reaction and by avoiding acidic or catalyzed alkyl silicates to provide an inorganic zinc rich single package coating composition.

Another respect of the invention is the ability of the novel two component binder to self cure upon the exposure of atmospheric moisture.

Another aspect of the invention is to provide a primer and coating composition for coating steel, iron and other ferrous bearing materials which can withstand saline environments and other corrosive conditions that are not strongly acidic nor alkaline in composition.

Other such objects and advantages of the present invention will become apparent to those skilled in the art from the specification in conjunction with the examples which illustrate various aspects of the invention.

DETAILED DESCRIPTION OF THE INVENTION

The present invention utilizes a two component binder to provide a single package zinc rich coating composition which cures upon reacting with moisture in the atmosphere. An alkyl silicate component along with an alkyl titanate component is utilized to form a copolymer system to which zinc dust or powder particles are added to provide the novel zinc rich coating composition. In the preferred embodiment of the invention ethyl silicate $Si(OC_2H_5)_4$ is utilized as the non-catalyzed alkyl silicate. Ethyl silicate provides not only an acceptable cure rate when combined with an alkyl titanate in accordance with the invention, but also is attractive commercially in view of current market considerations. However, as illustrated by the following example the ethyl silicate component which utilizes a low level of hydrolysis to provide a stable single package component is not sufficient alone to provide the advantages of the invention. The non-catalyzed ethyl silicate coating composition will exhibit shelf stability but its cure rate is totally unacceptable.

EXAMPLE 1

Ethyl Silicate 40 is a mixture of tetraethylorthosilicate and dimers, trimers, etc., exhibiting a hydrolysis level of approximately 42%. The ethyl silicate contains 40% silica as $SiO_2$ and is neither acidic nor alkaline. The following formula of ethyl silicate 40 was prepared on a laboratory Cowles disperser:

| Wt., grams | Material |
| --- | --- |
| 160 | Ethyl Silicate 40 |
| 100 | Xylene |
|  | stir thoroughly |
| 170 | Clay |
| 30 | Modified bentonite |
| 1200 | Zinc dust |
|  | Grind at high speed until thoroughly dispersed, then add slowly with agitation |
| 274 | Xylene |

The formulation enhibited a soft pigment settling and good stability upon aging for several months, but when applied the film was still wet and soft after 3 weeks of curing.

Similar to the silicate esters are the alkyl orthotitanates $Ti(OR)_4$ which undergo hydrolysis and condensation reactions similar to the alkyl silicates. However, in marked contrast to the alkyl silicates, the alkyl titanates undergo rapid reactions with water, particularly in the case of short chain alkyl esters where the reaction is almost instantaneous.

Consequently, attempts to formulate stable single package inorganic zinc rich coating compositions from alkyl titanates have not provided useful coatings since the stable alkyl titanates cure too rapidly as is illustrated in the following example.

EXAMPLE 2

The following formula was prepared on a laboratory Cowles disperser:

| Wt., grams | Material |
|---|---|
| 272 | Tetrabutyl titanate |
| 40 | Xylene |
|  | stir thoroughly |
| 170 | Clay |
| 30 | Modified bentonite |
| 1200 | Zinc dust |
|  | Grind at high speed until thoroughly dispersed, then add slowly with agitation |
| 228 | Xylene |

This composition exhibits shelf life stability similar to the formula in Example 1 but when the composition was applied to steel surfaces at 88° F. and 60° relative humidity, the coating composition dried to handle within 15 minutes and developed severe mudcracks shortly afterwards. The mudcracking apparently is the result of the surface setting hard before all solvent has evaporated from the film interior. Thereafter as the solvent diffused out, the resultant stresses were relieved by cracking.

In accordance with the invention, a stable single package zinc rich copolymer coating composition is prepared by blending a non-catalyzed alkyl silicate with an alkyl titanate to form a copolymer binder. Blends of alkyl silicate and alkyl titanate provide a useful binder for a stable zinc rich self curing coating composition which binder is believed to be a copolymer blend which cures in accordance with the equation:

$$xSi(OR)_4 + yTi(OR')_4 + 2(x+y)H_2O \rightarrow (SiO_2)_x(TiO_2)_y + 4xROH + 4yR'OH$$

wherein R and R' are alkyl groups selected from the group of alkyls consisting essentially of ethyl, n-propyl, isopropyl, n-butyl, isobutyl, sec-butyl and 2-ethyl hexyl.

The rate of the reaction cure increases as the level of alkyl titanate increases proportionately in the copolymer blend. It has been found that a threshold level exists as to the effectiveness of the alkyl titanate in the mixture. This level of effectiveness is about 10% titanate as $TiO_2$ to the total weight $TiO_2$ plus $SiO_2$. No upper limit of the titanate modification has been found to exist beyond which package stability and acceptable cure rate suffer. However, levels much above 50 or 60% by weight begin to show problems with mudcracking. Optimal and preferred levels are about 20 to 40% by weight.

The following example illustrates typical coatings employing the novel binder blends consisting of mixed ortho silicate and titanate esters, ethyl silicate and tetrabutyl titanate in accordance with the invention:

EXAMPLE 3

Coating compositions in accordance with the invention were made of the following blends of ortho silicate and titanate esters, ethyl silicate and tetrabutyl titanate.

| Formula<br>$TiO_2/SiO_2$,<br>wt. fraction | A<br>20/80 | B<br>30/70 | C<br>40/60 | D<br>50/50 | E<br>60/40 |
|---|---|---|---|---|---|
| Tetraethyl ortho silicate | 168 | 160 | 137 | 114 | 91 |
| Tetra butyl titanate | 72 | 82 | 109 | 136 | 163 |
| Xylene | 40 | 40 | 40 | 40 | 40 |
| Stir thoroughly Clay | 170 | 170 | 170 | 170 | 170 |
| Modified bentonite | 30 | 30 | 30 | 30 | 30 |
| Zinc Dust | 1200 | 1200 | 1200 | 1200 | 1200 |
| Grind at high speed until thoroughly dispersed, then add slowly with agitation |  |  |  |  |  |
| Xylene | 248 | 246 | 244 | 240 | 238 |

The foregoing coating compositions were applied by conventional spray and dried to handle within 15 minutes at 88° F. and 60% relative humidity. After overnight cure, all except Formula A were resistant to rubbing with a cloth soaked with methyl ethyl ketone (MEK). Formulas D and E showed a tendency to mudcrack, the others did not.

Low molecular weight silicate polymers or mixtures of the ortho esters and dimers, trimers, etc., can be used in place of the ortho silicate esters, but it is best to use the ortho titanate esters, because as the degree of polymerization decreases (zero with the ortho ester) the package stability increases, and the titanates are sufficiently reactive to cure rapidly once exposed to humidity. Example 4 illustrates the use of partially hydrolyzed and condensed ethyl silicate.

EXAMPLE 4

Tetraethyl ortho silicate was partially hydrolyzed and condensed (approximately 30 percent) in the presence of an alkaline catalyst:

| Wt., grams | Material |
|---|---|
| 200 | Tetraethyl ortho silicate |
| 100 | Anhydrous denatured alcohol |
| 9 | Deionized water |
| 2 | 26° ammonia |

The mixture was blended and maintained at room temperature for 24 hours. It was then transferred to a distillation flask and heated to its initial boiling point of 82° C. During distillation the temperature rose to 160° C., at which point distillation was stopped yielding 123 grams of distillate. The residue was a hazy liquid with a specific gravity of 0.951, a viscosity of 0.85 cps, and 30.6% $SiO_2$.

A stable single package formula was made from the distillation residue:

| Wt., grams | Material |
|---|---|
| 150 | Partially hydrolized ethyl silicate |
| 82 | Tetrabutyl titanate |
| 40 | Xylene |
|  | stir thoroughly |
| 170 | Clay |
| 30 | Modified bentonite |
| 1200 | Zinc Dust |
|  | Grind at high speed until thoroughly dispersed, then add slowly with agitation |

| Wt., grams | Material |
|---|---|
| 128 | Xylene |

The formula dries to handle in 20 minutes (72° F., 74 percent relative humidity) and is methyl ethyl ketone (MEK) resistant after overnight cure.

In Example 4 a hydrolysis procedure using ammonia as an alkaline catalyst is illustrated as one method by which a partially hydrolyzed low molecular weight polymer could be obtained. Other methods include the acid hydrolysis as described in U.S. Pat. No. 3,056,684 as well as a non-catalyzed procedure illustrated in Example 5.

EXAMPLE 5

Tetraethyl ortho silicate was partially hydrolyzed and condensed (approximately 42 percent) according to the following procedure:

| Wt., grams | Material |
|---|---|
| 400 | Tetraethyl ortho silicate |
| 200 | Anhydrous ethanol |
| 35 | Deionized water |

The mixture was charged to a reaction flask equipped with a stirrer, heater, and condenser. It was refluxed at 80° C. for 2 hours, after which time it was allowed to cool. A Karl Fischer moisture analysis indicated 0.85 percent water or about 15 percent unreacted water.

The hydrolyzed ethyl silicate was then used to prepare a stable single package zinc rich paint:

| Wt., grams | Material |
|---|---|
| 256 | Partially hydrolyzed ethyl silicate |
| 82 | Tetrabutyl titanate |
|  | Stir thoroughly |
| 170 | Clay |
| 30 | Modified bentonite |
| 1200 | Zinc Dust |
|  | Grind at high speed until thoroughly dispersed, then add slowly with agitation |
| 202 | Xylene |

The formula dries to handle within 30 minutes (70° F., 60 percent relative humidity), and methyl ethyl ketone (MEK) resistant after overnight cure.

Low molecular weight silicate polymers such as Ethyl Silicate 40, when combined with the titanate esters, can also be utilized to prepare stable single package zinc rich primers. Example 6 illustrates typical coating compositions employing the alkyl silicate and alkyl titanate binders to prepare a stable single package zinc rich polymer.

EXAMPLE 6

The following series of formulas illustrate the preparation of typical coatings using binders of Ethyl Silicate 40 and tetrabutyl titanate. Titanate modification ranges from 20 to 50% on the total binder as $TiO_2 + SiO_2$.

| Formula | A | B | C | D |
|---|---|---|---|---|
| $TiO_2/SiO_2$, wt. fraction | 20/80 | 30/70 | 40/60 | 50/50 |
| Ethyl Silicate 40 | 128 | 112 | 96 | 80 |
| Tetrabutyl titanate | 55 | 82 | 109 | 136 |
| Xylene | 100 | 100 | 80 | 80 |
| Stir thoroughly |  |  |  |  |
| Clay | 170 | 170 | 170 | 170 |
| Modified bentonite | 30 | 30 | 30 | 30 |
| Zinc Dust | 1200 | 1200 | 1200 | 1200 |
| Grind at high speed until well dispersed, the add slowly with agitation |  |  |  |  |
| Xylene | 253 | 242 | 252 | 241 |

When applied by conventional spray to sandblasted steel surfaces, all formulas dried to handle within 30 minutes (70° F., 60 percent relative humidity), but only formulas B, C, and D were resistant to methyl ethyl ketone (MEK) after an overnight cure. After an additional day's cure formulation A also became methyl ethyl ketone (MEK) resistant. These formulas have displayed at least a 6-month shelf stability and 2000 hours salt spray testing (ASTM B-117) with no effect.

The foregoing examples have described the utilization of ethyl silicate esters and tetrabutyl titanate. In the preferred embodiment an ethyl silicate ester is employed as the silicate component in the silicate-titanate blend because of the availability of ethyl silicate esters from a commercially economic standpoint. Other titanate esters are also available that perform as well as the butyl titanate utilized as alkyl titanate in the copolymer binder of the invention. One skilled in the art will recognize that the reactivity or rate of hydrolysis of other alkyl titanates utilized in the invention depends on the size of the alkyl group. The larger the alkyl group, the slower the hydrolysis rate. For application in the copolymer binder here, about the largest alkyl titanate ester consistent with practical cure rates is the 2-ethyl hexyl. At the lower limit, tetramethyl titanate is a solid at room temperature but is insoluble in aromatic solvents. The remaining esters can be either straight chain or branched, typically, ethyl, n-propyl, isopropyl, isobutyl, sec-butyl, etc. Example 7 illustrates the use of other silicate and titanate esters in the copolymer blends:

EXAMPLE 7

| Formula | A | B | C | D | E |
|---|---|---|---|---|---|
| $TiO_2/SiO_2$, wt. fraction | 30/70 | 30/70 | 30/70 | 30/70 | 40/60 |
| Ethyl Silicate 40 | 112 | 112 | 112 | — | — |
| Tetramethyl Silicate | — | — | — | 115 | — |
| Tetra n-propyl silicate | — | — | — | — | 168 |
| Tetra isopropyl titanate | 69 | — | — | 69 | 92 |
| Tetra (2-ethyl hexyl) titanate | — | 136 | — | — | — |
| Tetraethyl titanate | — | — | 44 | — | — |
| Xylene | 110 | 65 | 140 | 100 | 50 |
| Stir thoroughly |  |  |  |  |  |
| Clay | 170 | 170 | 170 | 170 | 170 |
| Modified Bentonite | 30 | 30 | 30 | 30 | 30 |
| Zinc Dust | 1200 | 1200 | 1200 | 1200 | 1200 |
| Grind at high speed until well dispersed, then add slowly with agitation |  |  |  |  |  |
| Xylene | 241 | 149 | 303 | 250 | 211 |

Alkyl borates or zirconylates may be utilized in combination with or as a substitute for the alkyl titanate component in the copolymer blends of the present invention. Two alkyl borate formulas were prepared, one using a $B_2O_3/SiO_2$ ratio of 20/80 to determine a comparison with the alkyl titanates, and the other using trimethyl borate as a minor component in a mixed silicate/titanate binder. A third formula was prepared using an alkyl zirconylate at $ZrO_2/SiO_2$ ratio of 30/70 for comparison with the alkyl titanates. The use of alkyl borates and alkyl zirconylates in the copolymer blends of the invention is illustrated in Example 8.

EXAMPLE 8

| Formula | A | B | C |
|---|---|---|---|
| Ethyl Silicate 40 | 232 | 128 | 112 |
| Trimethyl borate/methanol azeotrope | 100 | 6 | — |
| Tetrabutyl titanate | — | 57 | — |
| Tetra n-propyl zirconylate | — | — | 52 |
| Xylene | 50 | 100 | 130 |
| Stir thoroughly | | | |
| Modified bentonite | 6 | 30 | 30 |
| Mica | 23 | — | — |
| Clay | — | 170 | 170 |
| Zinc Dust | 960 | 1200 | 1200 |
| Grind at high speed until well dispersed, add slowly with agitation | | | |
| Xylene | 158 | 200 | 228 |

In formulation A, the borate modification did enable the coating to cure, but at a considerably slower rate than a similar level of titanate, and a certain incompatibility was noticed as evidenced by a soapy texture on the surface of the film, presumably a layer of boric acid. The second formulation, B, using a binder consisting of a $SiO_2/TiO_2/B_2O_3$ ratio by weight of 78/20/2 exhibited no discernable advantage over a silicate/titanate binder without borate. The third formulation, C, exhibited similar properties to formula B in Example 6, but evidenced a much increased tendency to mud crack.

The present invention for novel two component binder compositions for a single package inorganic zinc rich paint from silicate and titanate ester copolymer blends has been discussed with particular reference to paints containing zinc dust; however, the present invention is not limited to paints per se, and may be utilized for primers, precoats, and in other applications requiring a coating composition utilizing a metal rich coating in a copolymer binder. It will be appreciated that further substitutions and modifications may be made in the process by those skilled in the art without departing from the scope of the invention. Consequently these and various other modifications and substitutions may be made within the spirit and scope of the invention as defined by the following claims.

What is claimed is:

1. A single package zinc-rich coating composition which has shelf life stability but which is self-curing on application to a metal substrate and exposure to atmospheric moisture to give a coating which is completely inorganic, said composition consisting essentially of a mixture of
   (a) a non-catalyzed, essentially neutral or alkaline alkyl silicate of the formula $Si(OR)_4$ wherein R is alkyl selected from the group consisting of ethyl, n-propyl, isopropyl, n-butyl, isobutyl, sec-butyl and 2-ethyl hexyl;
   (b) an alkyl titanate wherein the alkyl is selected from the group consisting of ethyl, n-propyl, isopropyl, n-butyl, isobutyl, sec-butyl and 2-ethyl hexyl; and
   (c) zinc powder, components (a) and (b) functioning as the sole binder for said zinc powder, the composition being free from any added film-forming organic polymer and the powder being present in an amount sufficient to function as an anode to cathodically protect a ferrous substrate coated with said composition, the alkyl titanate being present in an amount of about 10–60% titanate as $TiO_2$ based on the total weight of the titanate and silicate as $TiO_2$ and $SiO_2$, respectively.

2. The composition of claim 1 wherein the amount of titanate, as $TiO_2$, is about 20–40% by weight based on the weight of titanate and silicate as $TiO_2$ and $SiO_2$, respectively.

3. The composition of claim 1 wherein the silicate is partially hydrolyzed tetraethylorthosilicate, the titanate is tetrabutyl titanate and the zinc powder is zinc dust.

4. The composition of claim 1 including a liquid vehicle and a neutral filler.

5. The composition of claim 4 wherein the vehicle is xylene and the filler is clay.

6. A coated product comprising a ferrous substrate coated with the composition of claim 1 and cured by exposure to the atmosphere.

* * * * *